United States Patent [19]

Moore

[11] 4,107,901
[45] Aug. 22, 1978

[54] LAWN MOWER WITH MECHANICAL LINE FEED

[75] Inventor: Robert J. Moore, Fontana, Calif.

[73] Assignee: Weed Eater, Inc., Houston, Tex.

[21] Appl. No.: 756,506

[22] Filed: Jan. 3, 1977

[51] Int. Cl.² .......................................... A01D 53/02
[52] U.S. Cl. ...................................... 56/17.5; 56/295
[58] Field of Search ............... 17/10.2, 12.7, 17.4, 17/17.5, 295; 30/276, 347

[56] References Cited

U.S. PATENT DOCUMENTS

| | | | |
|---|---|---|---|
| 2,557,598 | 6/1951 | Daggert | 56/17.4 |
| 3,664,102 | 5/1972 | Reber | 56/12.7 |
| 3,826,068 | 7/1974 | Ballas et al. | 56/12.7 |
| 3,859,776 | 1/1975 | Ballas et al. | 56/12.7 |
| 3,895,440 | 7/1975 | Pittinger, Jr. | 56/12.7 |
| 3,928,911 | 12/1975 | Pittinger, Jr. | 56/12.7 |
| 4,020,552 | 5/1977 | Mizuno et al. | 56/12.7 |
| 4,043,103 | 8/1977 | Lakin et al. | 56/295 |
| 4,047,299 | 9/1977 | Bair | 56/12.7 |

FOREIGN PATENT DOCUMENTS

1,502,459  4/1970  Fed. Rep. of Germany ............ 51/359

Primary Examiner—Russell R. Kinsey
Assistant Examiner—Paul J. Hirsch

[57] ABSTRACT

A rotary-type lawn mower with a motor driven housing member having at least one flexible non-metallic line projecting radially from its perimeter within a cutting plane and moving at an angular velocity sufficient to sever grass in a lawn mowing manner. The line has an effective cutting length extending from the housing member through a line support tube. A rotatable spool in the housing member carries a supply of the line in a coiled configuration with the unwound portion being extended from the tube into the cutting plane. A line feeding mechanism provides for automatic and/or manually selective spool rotation within the housing member to feed out upon command preselected increments of line during operation to maintain a desired effective cutting length but to secure the spool against rotation to prevent inadvertent unreeling of cutting line.

40 Claims, 4 Drawing Figures

LAWN MOWER WITH MECHANICAL LINE FEED

BACKGROUND OF INVENTION

This invention relates to methods and apparatus for cutting vegetation and the like, and more particularly relates to improved lawn mowing methods and apparatus.

It is now common practice to provide a greensward in conjunction with most residential and other structures intended for human use and occupancy, not only to enhance the overall esthetic appeal of such structures, but also to provide an area associated therewith for purposes of recreation and relaxation. It is also common practice to maintain such greensward in a mowed condition to further enhance its usefulness in this regard, and thus various forms of mowing devices have been devised and employed to more effectively mow such areas.

Many different forms of apparatus have been devised and made available for mowing a greensward and the like, although most of these devices may be characterized as either a "reel-type" mower or a "rotary-type" mower. Both of these types of mowers are sufficiently well known so as not to require explanation, except to note that they both employ one or more moving steel blades to sever the grass to a substantially uniform height. It is also well known that the rotary-type mower is inherently more dangerous to persons and property. It is also the most popular type of mower because it is easier to use and also because it is better suited to areas where the grass is either tall or thick or both.

What has not been generally appreciated is the likelihood of serious injury attaching to the use of a conventional rotary-type lawnmower employing a rigid steel blade. However, the National Electronic Injury Surveillance System has estimated that, during 1973 alone, there were 53,350 mower-related accidents serious enough to require hospital treatment.

The manufacturers of rotary-type lawnmowers have not been indifferent to this problem, of course, and have made strenuous efforts to provide against such injuries. For example, all mowers are provided with covers or "shrouds," not only to enclose the blade but also to route stones and other debris struck by the blade along a restricted predetermined route. In addition, these mowers are mounted on widely spaced wheels of relatively small diameter so as to improve their stability. There is a practical limit to such measures, however, and thus a conventional rotary-type mower will apparently always constitute a source of serious injury.

Because of this problem, there have been various attempts to change the basic design of this type of mower or to adopt other radical changes. For example, there is shown in U.S. Pat. No. 2,557,598 a lawnmower which is generally conventional in its overall appearance but wherein the rigid steel blade has been replaced by a disc having a plurality of metal wires extending radially from its perimeter. These wires have substantially less mass than a conventional mower blade, of course, and they are more flexible, and thus more yieldable, under impact. Nevertheless, a revolving steel rod or wire is only slightly less dangerous than a rigid blade, and will project debris with only slightly less force. Also, such a mower is significantly less effective for grass-mowing purposes.

In U.S. Pat. No. 3,091,905, there is disclosed another lawn mower wherein the lower portion of the shroud is provided with a grille-like plate with apertures for admitting the upward thrust ends of the grass and with honed edges at the apertures in the grille plate. The blade is replaced with a brush-like assembly which revolves over the plate to "wipe away" the grass ends sought to be cut, by drawing them over the honed edges in the grille. The bristles of the brush assembly are sufficiently stiff so as to cause the grass to be severed, but they are also sufficiently flexible so as not to project debris in a dangerous manner or to injure any portion of the body which may be inadvertently inserted through the grille member. There can be no dispute that such an arrangement, wherein the cutting member (the grille) is held stationary, is inherently safer than is a revolving steel cutting blade. Cutting effectiveness is basically a function of impact, however (except in a scissor-like arrangement), and thus a mower of this design is only limitedly effective when used in areas having high or dense vegetation.

In U.S. Pat. No. 3,208,209, the conventional rigid blade is replaced with a disc-like member having a plurality of relatively short and resilient wires extending from its periphery. When the disc-like member is revolved, the wires are sufficiently stiff so as to sever vegetation, but are sufficiently flexible so as to yield to any so-called "foreign" object. As will hereinafter be made apparent, however, such an arrangement will not achieve effective mowing without the addition of other features.

In U.S. Pat. No. 3,302,377, there is disclosed a novel cutting member intended to replace the rigid blade in a conventional rotary-type mower and which is formed of composite molded rubber reinforced longitudinally by elastic fibers. It is claimed that such a blade will either yield to foreign objects such as a shoe sole and the like, or will discharge rocks and other debris at safer velocities. It is also admitted, however, that such a blade is subject to wear during use and that it has a limited useful lifetime.

In U.S. Pat. No. 3,320,732, there is disclosed apparatus which is also intended to replace the conventional rigid metal blade in a rotary lawnmower and which includes a revolvable disc having a pair of non-metallic blades mounted at opposite points on its perimeter. Although the blades are preferably formed of a plastic such as polyurethane, they are intended to be wide enough so as to be substantially rigid, whereby effective cutting is achieved. On the other hand, pivotally attaching the blades to the disc permits them to yield upon encountering a foreign object.

Other examples of devices and apparatus intended to replace the rigid steel blade in a conventional rotary lawnmower may be found in U.S. Pat. Nos. 3,340,682, 3,389,541, 3,444,675, 3,474,608 and 3,664,102. However, none of these or the other innovations cited herein have been a solution to the problem, and thus the rotary lawnmower with a rigid steel blade has continued to be the most widely used device for these purposes.

Recently, a completely new type of vegetation cutting device has been developed and marketed under the trademark "Weed Eater," which device is depicted generally in U.S. Pat. Nos. 3,708,967, 3,826,068 and 3,859,776, and which employs one or more flexible non-metallic cords which are revolved to function as cutting elements. This type of device has enjoyed spectacular commercial success as an edger/trimmer, since it provides a number of advantages which cannot be found in conventional cutters. For example, these cutters are capable of reaching into areas not accessible to rigid steel blades and the like, and thus the Weed Eater trimmer can remove weeds and other vegetation located in close proximity to walls, fences, trees and even within crevices in such walls and the like, without damage to such walls and trees. Second, and more important for present purposes, the Weed Eater trimmer is substantially completely safe to operate since the revolving cords will cause injury under only the most unusual circumstances.

Because of these advantages, as well as others, it has been proposed to construct a lawn mower incorporating this principle to thereby eliminate the hazards which are inherently present with conventional mowers. More particularly, it has been proposed to replace the rigid steel blade in such mowers with a head assembly having one or more such flexible cords and to revolve such assembly and cords to sever the grass on a greensward. This proposal has proved to be deceptively oversimple, however, and is based on a misconception that the Weed Eater edger, as presently built and marketed, is the functional equivalent of a conventional lawn mower. Accordingly, all such attempts to construct an operable lawn mower employing such a cutting element have hitherto been failures for the reasons hereinafter set forth.

It is common practice to broadly characterize all powered grass and weed cutting devices as "lawn mowers," excepting those machines intended to be used by commercial agriculturalists and the like. There is a basic functional distinction between a lawn mower per se, however, and a device which is more accurately denoted as an "edge/trimmer," and this distinction must be clearly understood to appreciate the reason why it has not been possible to merely replace a steel blade with a Weed Eater trimmer head assembly.

The basic principle of any lawn mower per se is that the cutting element or elements are manipulated strictly within a cutting plane which is fixedly located relative to the surface of the area being mowed. The reason for this is that the very concept of "mowing" contemplates the leveling of the grass to produce a carpet-like effect, and thus the blade must be rotated in a plane which is fixedly positioned relative to the surface of the earth. Otherwise, the greensward would have a ragged, uneven appearance after being cut, and this is not the effect or result sought to be achieved.

When a rigid steel blade is revolved in this plane, it yields to the grass only to the extent that it may tend to slow, but it does not become warped or distorted so as to be deflected from its intended cutting plane. If a flexible non-metallic string is revolved to cut vegetation, however, it yields to the grass in various ways. In particular, it not only yields laterally in that it assumes a curvilinear configuration, but it also tends to be deflected upward by the grass it is cutting. Accordingly, if the cords of a Weed Eater trimmer are brought into contact with resistant vegetation, these cords tend to move in a cutting "plane" which actually has a warped configuration.

This warping effect is an advantage of the Weed Eater edger/trimmer, since it is this which enables its user to manipulate its cords to cut away the most inaccessible vegetation. When a mower is constructed in the manner of the Weed Eater trimmer, however, this warping effect tends to produce swaths having convex configurations, and this is extremely undesirable from an asthetic standpoint.

An edger/trimmer, and especially the Weed Eater trimmer, is not intended as a leveler, per se, but as hereinbefore stated, is intended to reach vegetation growing in otherwise inaccessible locations. Thus, an edger/trimmer must provide a cutting plane which can be manipulated into a variety of angles with respect to the surface of the earth and, in the case of the Weed Eater edger, must be capable of non-alignment of its cutting elements relative to its normal cutting plane. The Weed Eater trimmer is presently designed and marketed is carried by the operator so as to facilitate such manipulation. Even an edger/trimmer using a revolving steel blade is supported on no more than two spaced-apart wheels in order that its cutting plane may be tilted as needed.

Another functional difference between a rotary-type mower and an edger/trimmer is the diameter of their cutting planes. Cutting actually is accomplished at the tip of the cutting element, whether the element is a flexible cord or a rigid steel blade, and since cutting is a function of tip velocity, it will be apparent that the diameter of the cutting plane must be such as to provide for effective cutting. In the case of a lawn mower, however, the prime consideration in selecting the proper diameter of the cutting plane is the width of the swath sought to be cut.

Contrary to presupposition, a plastic string can usually cut vegetation almost indefinitely without breaking, provided the string engages only vegetation of the type sought to be cut. On the other hand, it will also be apparent that if a plastic string does impact against a resistive object, the string or line will be more likely to break than will a rigid steel blade. Since this type of cutter is expressly intended to be used to cut vegetation including such resistive objects, it will not be surprising that the string or line will often experience wear or breakage, and that the string or line must therefore be replaced from time-to-time.

It has been found necessary and desirable to provide mowers with a spool having a substantial length of cutting line coiled therein, and to employ only a short unwound portion of the line as the cutting member. Thus, if a portion of the extended cutting portion of the line becomes worn, damaged or broken, the cutting member may be replaced by manually unwinding a new portion of line from the spool, and extending this unwound portion to form the new cutting member.

This manner of manually providing replacement cutting line has been found to be subject to certain problems, however. It is desirable to protect the coiled portion of the line from moisture and debris by enclosing it in a circular housing or head member, and to extend the unwound portion through a peripheral aperture in this head member to form the cutting member. Therefore, if the string breaks at a point at or within the head member, it is often necessary to remove and disassemble the head member in order to gain access to the head member.

Another problem with providing for manually unwinding cutting line from its spool arises from the fact that the spool is recessed snugly within the circular head member to prevent the line from escaping from the spool and head member during revolvement of the spool and head member. Thus, when it is desired to withdraw or unwind more cutting string, it is necessary to manually pull on the string to feed additional length of line and this pulling tends to damage the cutting line or string. It will be apparent that this, in turn tends to greatly reduce the overall convenience of this type of mowing apparatus, and to create an operating problem which is not present in more conventional mowers.

It has been proposed to overcome this and other related disadvantages by providing vegetation cutting equipment with means for mechanically extending or feeding out lengths of cutting line from the head member. There is, for example, depicted and described in U.S. Pat. No. 3,928,911, issued to Pittinger, a mechanical line feeding mechanism for use with an apparatus for cutting vegetation and the like with a flexible non-metallic string. There is also depicted and described in U.S. Pat. No. 3,664,102, issued to Reber, a flexible non-metallic cord type mower which utilizes a mechanical line feeding mechanism.

Although the Pittinger device does provide mechanical and incremental line feed when actuated, the device is subject to certain disadvantages to limit its practical value. Thus, the device requires a pair of pivoted toothed jaws which cam the line member therebetween. The camming action of the teeth on the line member injures the line member and produces weaknesses and flaws therein. Hence, the teeth of the camming jaws cause internal flaws and indentations in the line member which are highly undesirable since such flaws and indentations weaken the line and contribute to line breakage as the weakened and idented section is withdrawn and used as the flail portion of the cutting assembly. In contrast, the device of the present invention includes no direct contact of mechanical elements with the line member itself and thus, avoids any chance of damaging any of the stored portion thereof.

The Reber device includes a toothed control wheel that positively drives a toothed line reel with which it is intermeshed. While this system provides mechanical and incremental line feeding it is relatively complex in construction thus rendering manufacturing difficult. In addition, the system of intermeshing elements adds excessive weight to the mowing unit thus rendering it difficult to handle and causing serious problems in the maintenance of rotational balance of the cutting assembly. In contrast thereto, the device of the present invention is simple in construction and involves lightweight components.

The disadvantages of the prior art are overcome with the present invention in novel method and apparatus for cutting a greensward in the best lawn mowing manner. More particularly, a rotary-type lawn mower is provided which has generally a conventional configuration, but wherein a rotatable head member carries one or more flexible non-metallic cords or lines extending radially therefrom into a cutting plane whereby the grass is cut effectively and with safety to personnel and property. As in the conventional lawn mower, the rotary speed of the housing member is determinative of the angular velocity of the tip of the line and it is therefore preselected for vegetation cutting effectiveness. Moreover, the diameter of the head member with extended line determines the width of the swath sought to be cut. A typical swath may be between 18 and 24 inches wide. The terms "cords" and "lines" are used interchangeably and as full equals in elemental function and results.

A plurality of such lines is of advantage in that the mower continues to cut grass and weeds until all of the lines are broken. Unfortunately, the swath width tends to decrease in a lawn mower employing cutting lines of this type as their effective cutting length decreases. Of course, the mower could be inverted to lengthen the cutting line to the desired effective cutting length but such a task with a large machine is not easy. Also, great hazard exists in inverting hot gasoline powered mowers to effect cutting line replacements. In the novel lawn mower of this invention, the operator can selectively extend the cutting line to achieve a desired effective length while the mower is in operation cutting a swath in the lawn. In addition, this function can be provided by an automatic mechanism so that the cutting line driving operation is always extended to the desired effective length and thereby maintains a prescribed swath being cut. In no event can the line be extended beyond a certain effective length nor can it be pulled from the rotating head member at any condition other than during deliberate line extension.

SUMMARY OF THE INVENTION

This invention provides an improved rotary lawn mower and includes a head member rotatable about an axis generally perpendicular to the cutting plane. One or more flexible non-metallic cutting lines are carried by the head member. A supply of each cutting line is carried upon a spool movably mounted within the head member with an end portion of the cutting line extending from the head member into the cutting plane. Means release the spool for movement within the head member so that only a preselected length of cutting line will be automatically fed out of the head member during operation of the lawn mower. Means for actuating the means to release the spool for movement by operator selection or in an automatic function are present.

In another embodiment of this lawn mower, the operator can actuate electrically the means releasing the spool so that the preselected length of cutting line will be extended outwardly from the head member into the cutting plane. Irrespective of repeated actuation, the cutting line cannot be extended beyond a preset maximum extended length from the head member in either manual or automatic operation.

In one preferred form, the lawn mower carries an actuating mechanism for releasing the spool for movement which is operable remotely from the rotating head member as at a point at the upper end of the mower handle. After a preselected length of cutting line is fed from the head member, the spool is secured against movement to oppose discharge of cutting line until the next actuation desired by the operator. Thus, accidental unwinding of cutting line, as when the line becomes entangled with objects in the vegetation and the like, will be effectively prevented.

It is a novel feature of the present lawn mower invention to provide a simple and lightweight line feed mechanism that can be actuated selectively during operation of the mowing device to feed from the rotating head member incremental lengths of additional cutting line into the cutting plane. In a particular embodiment, a solenoid operated cam mechanism is provided on the head member of the assembly. A lever assembly is operatively associated with the cam mechanism whereby actuation of the solenoid by the operator or automatically causes the cam mechanism to allow the spool carried within the head member to move with respect to the head member and thereby feed out only a certain incremental length of cutting line.

It is another feature of the present lawn mower invention to provide a feed system wherein a spool member containing a supply of line is rotatably mounted within the head member. Actuation of a cam mechanism frees the spool for incremental movement within the head member thereby extending an additional section of line of predetermined length and then relocks the spool to the head member. The camming action provides instantaneous movement of the spool within the head member from a first locked position to a second locked position.

The present lawn mower will cut lawn over a long period of time since the cutting line is fed selectively or automatically as needed from the supply on the spool within the cutting head. Obviously, the supply of line on the spool from time to time will have to be replenished with new line, or alternatively, a spool full of line will have to be substituted. Consequently, it is a feature of the present lawn mower invention to provide a rapid, efficient and simple means for removing the spool from the head whereby a new cutting line may be wound onto the storage spool. Alternatively, means may be provided for employment of a fresh insertable spool. In addition, easy access to the head facilitates line untangling and other similar operations when necessary.

These and other features and advantages of the present invention will become apparent from the following description, wherein reference is made to the figures in the accompanying drawings.

DETAILED DESCRIPTION

Figure 1:
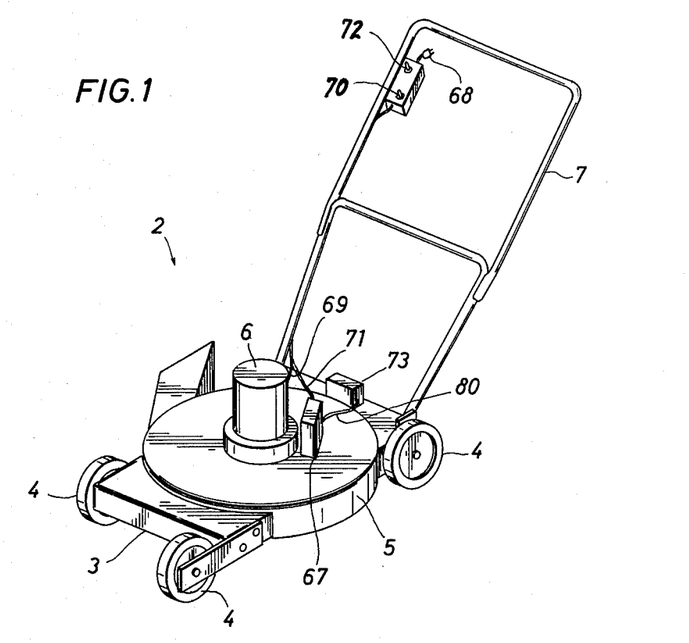
FIG. 1 is a pictorial representation of a rotary lawn mower having a cutting means embodying the present invention.

Referring now to FIG. 1, there may be seen a pictorial illustration of a conventional rotary lawn mower 2 which has been modified to incorporate the principles of the present invention. More particularly, the lawn mower may be seen to have a chassis 3 supported upon a plurality of spaced-apart wheels 4 and to be further provided with a shroud 5 for containing a suitable cutting assembly 8 which, in turn, is rotated in a horizontal manner relative to the surface of the earth by suitable electric motor 6 or other driving means. A suitable handle 7 may also be provided for steering the lawn mower 2 in a conventional manner.

Figure 3:
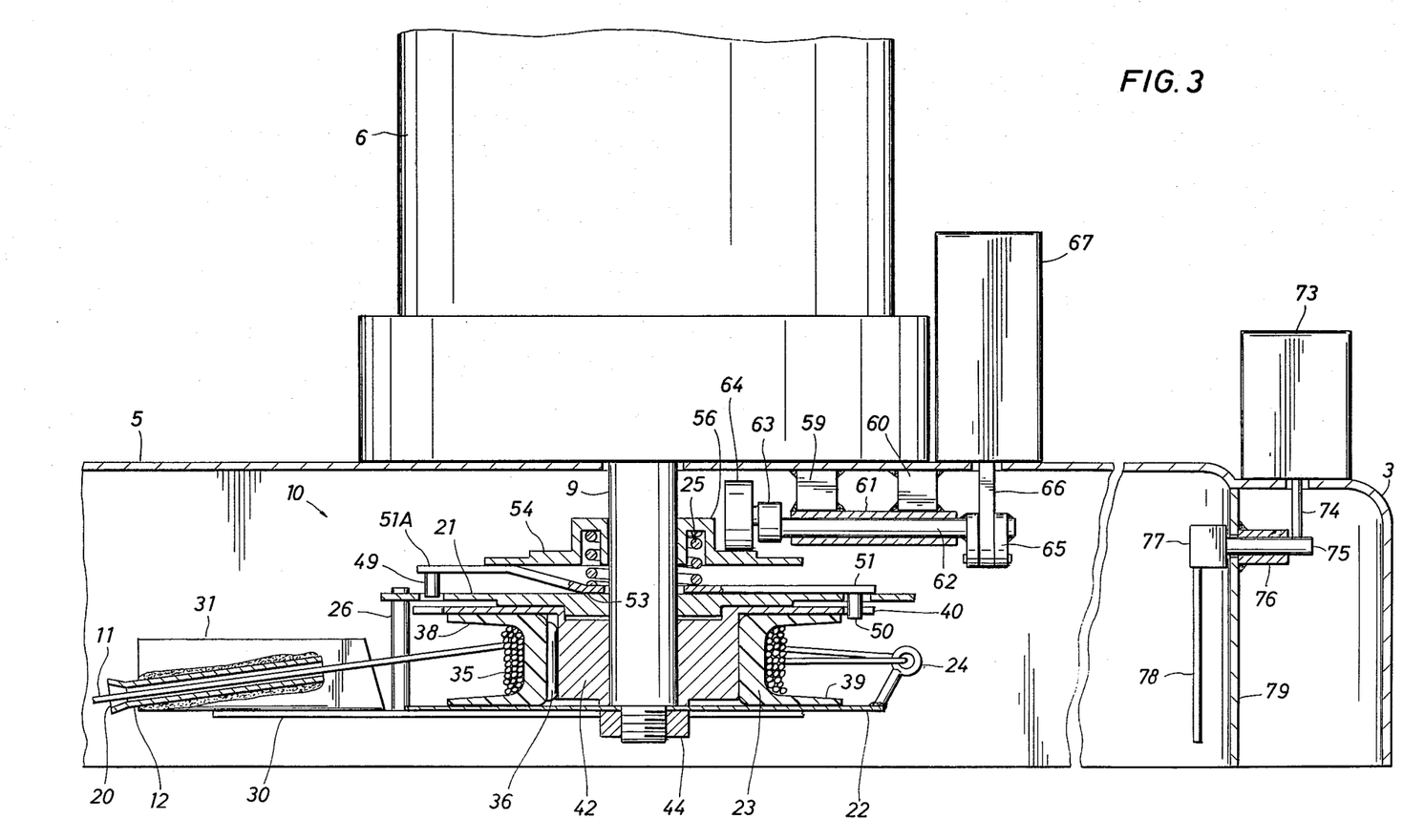
FIG. 3 is a pictorial view, partly in cross-section, of a portion of the apparatus depicted in FIG. 1.
Figure 4:
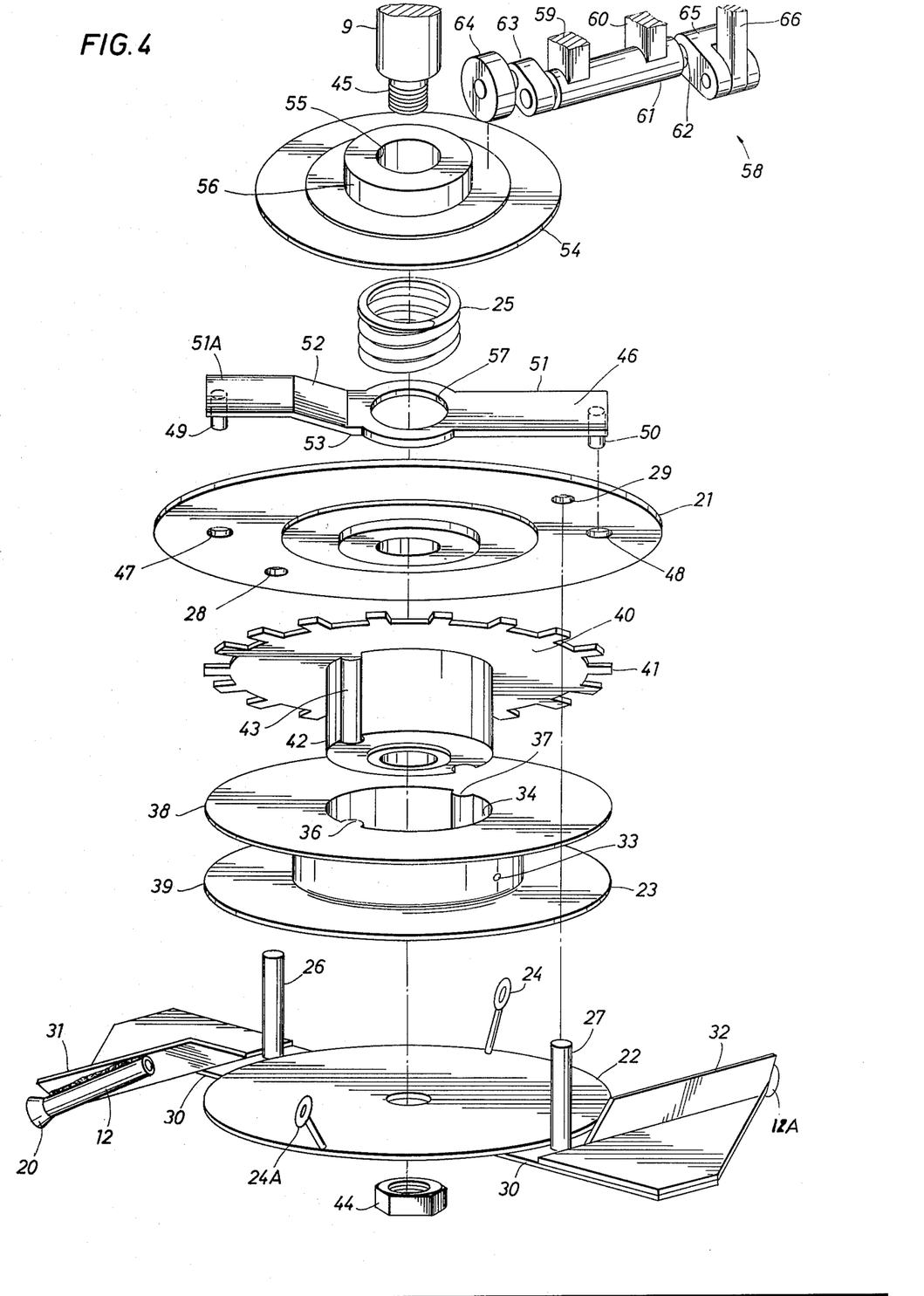
FIG. 4 is another pictorial representation of the apparatus depicted in FIG. 3 but shown in an exploded fashion.

Referring now to FIGS. 3 and 4, there may be seen a more detailed pictorial illustration of the cutting assembly 8 suggested in the apparatus depicted in FIG. 1. More particularly, the cutting assembly may be seen to be a head or housing which is concentrically mounted on the shaft 9 of the motor 6 and having a non-metallic flexible cord member 11 projecting radially from its periphery. As may further be seen, the cord member 11 is peripherally mounted within a tube or supporting member 12 for holding the member 11 in a manner such as to support the cord against vertical as well as lateral deflection due to contact with the grass sought to be cut.

As hereinbefore explained, when the head member 10 is revolved, the outwardly projecting cord member 11 acts to sever the grass as it is revolved within a cutting plane defined by its tip. The lawn mower 2 will be moved progressively in a forward manner so as to cut a suitable swath across the lawn or greensward. As the head member 10 is revolved, the cord member 11 will accordingly intersect and sever the grass immediately confronting the lawn mower 2, and will not encounter grass except in front of the lawn mower 2. As hereinbefore explained, however, there is a tendency for the cord member 11 to be deflected not only laterally in a swept-back manner, but also to be deflected upwardly in a vertical manner with respect to the head member 10. Furthermore, as the cord member 11 encounters vegetation in a thicker condition (as it does by rotating across the swath), this vertical deflection will be a function of thickness of the vegetation. Accordingly, as the cord member passes from the front of the lawn mower 2 and is rotated back towards its rear, the cord member then will drop in a vertical manner to produce an oscillating effect which is undesirable in so far as producing an evenly mowed appearance across the greensward. Thus, if this vertical deflection has not been overcome, each swath will have a rounded or convex configuration produced by the upward deflection of the cord member 11, whereas what is desired is a flat appearance or shape.

Referring now to FIG. 3, there may be seen the cutting assembly 8, wherein special provision has been made to support the cord member 11 against such deflection. In particular, it will be seen that the cord member 11 is supported within a mounting tube 12 having a portion sufficient to support at least 50% of the overall length of the cord member 11, and which is further provided with a flared or curved curvilinear side wall line-bearing surface 20 at the exit portion of the tube 12, whereby the cutting line will be supported in a curvilinear manner in the event that such deflection does occur. The purpose of this curvilinear surface 20 is not to support the cutting line 11 against deflection, but to provide that if such deflection occurs, the cord member 11 will have a curvilinear configuration and will therefore not be subject to abnormal breakage which will result if the line member 11 is angularly deformed. It has been found that if the cord member 11 is mounted and supported in the manner depicted in FIG. 3 it will actually experience very little wear and breakage due to contact with grass, but that it is sometimes subject to breakage upon encountering foreign objects such as rocks or other debris in the grass. In the event such cord members require replacement, the automatic feed mechanism permits it to be replaced, as will be hereinafter described.

Referring now to the exploded view depicted in FIG. 4, there is therein illustrated the details of the cutting assembly 8. More particularly, the housing or head member is provided by a pair of upper and lower plate members 21 and 22. Lower plate member 22 includes a pair of upstanding post members 26 and 27 which mate respectively with a pair of apertures 28 and 29 in the upper plate 21. The upper and lower plates 21 and 22 when assembled provide the housing for the spool member 23 to be carried thereby. Included on the lower plate 22 are a pair of line guide eyelets 24 and 24A which function to direct the flexible cord from the spool 23 and into one of the support tubes 12 and 12A. Thus, when assembled, the cord passes from spool 23 in a path inside post 27, through eyelet 24, then outside of post 26 and into and through tube 12. The cord would be similarly threaded in the event tube 12A is selected.

Attached to the bottom of lower plate 22 is a flat bar element 30. To this flat bar are secured a pair of angle members 31 and 32 which provide the means for attaching and disposing the support tubes 12 and 12A to be directed in a cutting plane. The members 30, 31, and 32, thus provide a system whereby the tubes 12 and 12A may be arranged to be directed in various relationships with respect to the plane of the lower plate 22. These tubes may be directed parallel to the plane of the lower plate or at various angular relationships with respect thereto.

While it is contemplated that only a single cutting line be employed obviously two or more lines could be used. The spool 23 includes an aperture therein for receiving one end of the wound line. Thus, the line is inserted through the aperture 33 and passed into the hub portion 34 of the spool 23 where it is knotted to prevent that end of the line from pulling free of spool 23. The line is thereupon wound onto the spool in a direction opposite the intended direction of rotation of the head assembly. This wound portion 35 as seen in FIG. 3, constitutes the stored portion of the cutting line. As noted above, the line is then threaded from the spool 23, inside post 27 and through eyelet 24, outside of post 26, and through tube 12. If it is desired to employ a pair of cutting lines as flail elements, the cord is first doubled along its length to provide two free ends. The doubled end is then inserted into aperture 33 and knotted as described above. Thereupon the spool 23 is wound with the doubled line until full to provide two free cord ends. The first free cord end is passed through eyelet 24 and tube 12 as described above. The second and remaining free cord end is threaded through eyelet 24A and passed through tube 12A. Normally, however, it will be necessary to use only a single cutting line. Obviously three or more lines could be employed. This would entail, however, the addition to the lower plate 22 further eyelets and tube assemblies. Where more than a single line is desired, it is possible to employ a tiered type of spool rather than to wind thereon a doubled length of line. Thus, if two cutting flails are to be provided, a segmented spool with two windings of line may be used. This tiered and segmented spool is of the type described in U.S. patent application Ser. No. 706,623, filed July 19, 1976, and assigned to the same assignee as the present invention. Thus, reference may be had to this prior application for details of the segmented spool construction referred to above as applicable herein in the case that plural lines are found to be desirable.

With reference still and again to FIG. 4, spool 23 will be seen therein to include a pair of keys 36 and 37 located within the hub portion 34 and extending between the top and bottom flanges of spool 23. Flanges 38 and 39 are sized and are of a diameter less than the distance between posts 26 and 27 for receipt therebetween. These flanges 38 and 39 are further of a diameter less than the distance between eyelets 24 and 24A. Further, the surfaces of the flanges 38 and 39 are free of any protuberances so as to make capable the rotation of the spool between upper and lower plates 21 and 22 in cases where it is desired to incrementally feed fresh line as will be described hereinafter in greater detail. Disposed for receipt within the hub 34 of the spool 23 is a toothed ratchet 40 having teeth 41 thereon and including a keyway guide element 42, for receipt within hub 34 of the spool 23. The keyways 43 of the guide element 42 are sized for receipt upon and for mating engagement with the keys 36 and 37 of spool 23. It should therefore be apparent, that the head or housing member 10 of the present invention constitutes the upper and lower plate assemblies 21 and 22 and with the spool 23 and ratchet element 40 disposed therebetween. The elements are maintained in assembled relationship by hexagonal nut member 44 which is screw-threaded upon the lower portion 45 of drive shaft 9 that passes concentrically through these elements. When it is desired to disassemble the housing, in order to replace spool 23 or to rewind spool 23 with fresh cutting line, it is simply required to remove nut 44 and drop the lower plate from shaft 9.

Referring again to FIG. 4, the apparatus for providing the automatic, mechanical, and incremental feed will now be described. More particularly, this system includes a pivotable lever arm 46 disposed above the upper housing plate member 21. The plate member 21 includes a pair of apertures 47 and 48 therein and disposed in alignment for reception of at least one of two locking pins 49 and 50 attached to the underside of the lever arm 46. One arm 51 of lever 46 extends generally in the plane of the upper plate 21 whereas the second arm 51A rides above the plane of upper plate 21 by virtue of the angled section 52 of arm 51A. It is about the point of intersection 53 of arm 51 and section 52 that the lever 46 pivots. Thus, the lever 46 is so constructed to move alternately between a first position wherein arm 51 is generally flush with upper plate 21 and pin 50 extends through aperture 48, and a second position wherein arm 51 is raised from plate 21 and arm 51A is lowered to extend pin 49 into aperture 47. The lever 46 therefore pivots about point 53 to alternately raise and lower pins 49 and 50 with respect to the corresponding apertures 47 and 48 of upper plate housing member 21.

Disposed above lever arm 46 and in axial alignment therewith will be seen cam disc 54. The cam disc 54 is apertured as at 55 for receipt therethrough of drive shaft 9 of the electric motor 6. An annulus section 56 is provided in the cam disc 54 and provides therein a seat for one end of a spring element 25 which is biased between the cam disc 54 and the pivotable lever arm 46. While the drive shaft 9 is passed through aperture 55 in a close tolerance relationship, as can be seen more fully in FIG. 3 for example, both the spring biasing element 25 and the lever arm 46 are spaced therefrom. Aperture 57 of lever arm 46 provides sufficient clearance from the drive shaft 9 in order to allow the lever arm 46 to pivot about point 53 as outlined hereinabove. With this arrangement, the cam disc 54 is free to move toward and away from the upper plate 21. Movement of the cam disc 54 toward upper plate 21 actuates the pivoting of lever arm 46 about point 53 by virtue of its contacting relationship with surface 51A of lever arm 46. Movement of the cam disc 54 away from upper plate member 21 is provided by the biasing action of the spring element 25.

In FIG. 4 there will further be seen a cam mechanism generally indicated at 58. The cam mechanism will be seen to comprise a pair of stationary mounts 59 and 60 for attachment to the wall of shroud 5 as seen in FIG. 3 for example. The mounts 59 and 60 carry a tubular sleeve 61 attached thereto. Disposed within sleeve 61 is a shaft 62 having at one end thereof an eccentric element 63 to which is attached roller 64. The opposite end of the shaft 62 passes into a lever block 65 which in turn is attached to one end of a solenoid-actuated force bar 66. Force bar 66 moves vertically which in turn rotates shaft 62. The rotation of shaft 62 in turn moves the eccentric 63 to raise and depress roller 64. More particularly and with reference to FIG. 3, the cam mechanism is seen in its normal position with force bar 66 at its lowermost extent. When the solenoid 67 is actuated, the force bar 66 is raised vertically. This raising of the force bar 66 causes the shaft 62 to turn within the tubular sleeve 61. As shaft 62 turns, eccentric element 63 is caused to move therewith. Due to the eccentric relationship of element 63 with respect to shaft 62, the roller 64 is caused to be depressed against the cam disc 54. This in turn forces cam disc 54 downwardly along drive shaft 9 toward upper plate 21 and against the bias of spring 25. This downward movement of cam disc 54 depresses surface 51A of the lever arm which in turn pivots about point 53. As lever arm 46 pivots, pin 50 of arm portion 51 is lifted out of engagement with aperture 48 of plate 21. Simultaneously therewith, arm portion 51A of lever 46 is lowered whereby pin 49 is forced into the aperture 47 of plate 21.

As each of the pins 49 and 50 are moved alternately into and out of engagement with the upper plate apertures 47 and 48 each time solenoid 67 is actuated, they correspondingly cooperate with the teeth 41 of ratchet 40. Thus, pin 50 will move out from locking relationship with one of the teeth 41 while pin 49 will move into locking relationship with another of the teeth 41 of ratchet 40. Movement of the spool 23 within the head member is caused by the centrifugal force generated by rotation of the unit which is considerable. Since the flanges 38 and 39 are smooth as are the walls of the upper and lower plates 21 and 22, there is little or no resistance to the rotational movement of the spool 23 and ratchet 40 which is keyed thereto. Thus, each time the solenoid 67 is actuated to institute the camming action of mechanism 58, the spool will be freed for rotational movement with respect to the upper and lower plates. The spool 23 will rotate to an extent determined by the action of the pins 49 and 50 which are so constructed and arranged, as detailed above, to instantaneously move from one slot to another. It should be noted, in this regard, that the particular number of teeth 41 in ratchet 40 will determine the length of fresh line extended each time the solenoid 67 is actuated. For example, if six teeth 41 are provided, each actuation of solenoid 67 will automatically and incrementally feed an additional fresh length of line 11 equal to one-sixth of the circumferential extent of the coiled portion 35 wound on the spool 23. Obviously, any number of teeth 41 may be provided depending upon the particular design parameters of the unit involved and the particular length sought to be extended in each instance. Teeth 41 in the range of 12 – 24 have been found to be desirable however.

As hereinbefore stated, it is an object of this invention to provide a lawn mower having flexible, non-metallic cutting elements instead of the conventional rigid metal blade, in order to achieve safety to not only the operator but also to persons and property within its vicinity. It is also an object of the present invention to provide a lawn mower of this type which will also achieve effective cutting.

The Weed Eater edger/trimmer has shown that a flexible non-metallic cord can be used to cut vegetation. As hereinbefore explained, the rigid metal blade cannot be replaced by a cutting head of the type employed by the Weed Eater edger for the following reasons. In the first place, flexible cords tend to be deflected upwardly from the cutting plane by the grass sought to be cut. Further more, the extent of such upward deflection will not only increase as a function of the amount of vegetation encountered, but also as a function of the forward velocity of the lawn mower assembly across the greensward. This problem has not previously been encountered with apparatus of the type exemplified by the Weed Eater trimmer, because an edger/trimmer is moved more slowly during its use, and also because the operator of a Weed Eater trimmer tends to compensate for this effect by instinctively changing its cutting plane, whereas a rotary lawn mower may not be manipulated by its operator so as to change the position of its cutting plane.

In addition to this problem, it should be noted that flexible non-metallic cords tend to produce a blowing effect which, in turn, tends to blow the grass away from the tips of the cutting lines. This, in turn, tends to cause the grass to lie down in front of the mower, which also tends to restrict its effectiveness as a cutting device. The rigid blade in a conventional rotary-type lawn mower is formed to act as a fan to draw the grass upwardly into the blade, but this advantage is not present with a lawn mower employing flexible cords as its cutting elements.

Another problem arises from the fact that the flexible cords tend to yield to the grass which they encounter. A steel blade will not yield but instead will tend to be retarded within its cutting plane, with the result being that the motor will bog down and perhaps even die. A flexible non-metallic cord will, in contrast, be directed in a horizontal manner and will yield to the uncut grass rather than to stall the motor. In this event, the motor tends to continue operating but ineffective cutting results as the mower moves more rapidly into the grass sought to be cut, or in the event that it encounters denser vegetation. Also, a collateral disadvantage is that the cords tend to become abraded because of friction with uncut grass.

It has been proposed to tilt the cutting plane of the mower as a function of its forward speed in order to overcome this problem. However, such a solution to the problem would require complex and expensive apparatus, thereby greatly limiting the desirability of a lawn mower employing flexible cords as cutting elements.

It is now understood that cutting effectiveness of a flexible non-metallic cord is primarily a function of impact, and that impact, in turn, is primarily a function of velocity and mass of the tip of the revolving cord. The mass, of course, is primarily a function of the diameter of the cutting tip, since the non-metallic cord is of a relatively light weight.

It has been proposed to overcome the foregoing problems by increasing cutting velocity, and this is beneficial to a point. However, increasing cord velocity also requires an increase in power which, in turn, is obviously disadvantageous. Second, increasing the cord velocity without also increasing the cord mass can only be accomplished up to the point where the extended portion of cutting line tends to lag rotation of the plate member because of wind resistance.

The foregoing problems may also be attached by increasing the mass of the cutting tip of the cord, i.e., by increasing its diameter. If the diameter is increased, however, this also compels an increase in power merely to maintain the pre-established velocity, and also windage (wind resistance) is a special problem with a cord formed of a light-weight material such as nylon. Increasing the diameter and the tip velocity of the cutting cord will, of course, be helpful, but this not only requires additional power but also increases the wear to be experienced by the cutting lines. In addition, an increase in tip velocity will also create problems of vibration and friction within the overall assembly.

These problems are overcome with apparatus of the type depicted herein whereby the extended portion of the cutting lines 11 projects through tubes 12, and whereby these tubes are defined by curvilinear line bearing surfaces 20, as hereinbefore explained. A further feature is to limit the extended length of the cutting line 11 to a length whereby the stiffness of the line is sufficient to aid in avoiding deflection, and yet whereby the flexibility is sufficient to avoid creating safety problems. More important, however, is the fact that the extended portion of the line should not be greater than the portion of the line secured along its length by the support member 12. The length of the cutting line 11, is of course a function of its diameter and it has been found most suitable to employ a cutting line having a diameter of 0.100 inches.

As hereinbefore stated and further depicted in FIG. 1, the ideal embodiment of this invention features an electric motor 6. The fundamental concept of a permanent magnet motor assumes the presence of a first electromagnetic field, which is generated by the magnet (or magnets) and which is therefore fixed both as to intensity and position, and a second electromagnetic field which is generated by a winding rotatably positioned in the first field. The intensity of the second field is functionally related to the magnatude of the amperage, the AC current which energizes the winding, and since the actual amount of amperage in any AC current at any given time is a function of its frequency, it will be apparent that the intensity of the second field is a function of the frequency of the AC current as well.

The amount of force required to rotate the winding is a function corresponding to the product of a constant and quantity which, in turn, may be stated as a fraction wherein the numerator is the product of the intensities of the two fields, and wherein the denominator is the distance between attracting poles of the fields. Initially this force is at a maximum, not only because the distance between the two attracting poles is at a maximum, but also because of inertia. Thus, the winding will draw a maximum current flow to effect initial rotation. Since the frequency of the energizing AC current is fixed, however, it will be apparent that, after the winding begins to rotate, the distance between the poles will tend to decrease as each pulse of current arrives at the winding. This, in turn, not only tends to accelerate rotation of the rotor or armature of the motor, but it also tends to decrease the amount of current required by the winding to effect such rotation. Accordingly, the difference between the intensities of the two fields is greatest upon start-up, but this difference decreases thereafter until the intensity of the field generated by the winding approximates the intensity of the field generated by the permanent magnets in a motor of this type such as depicted in FIG. 1 generally at 6.

The intensities of these two fields will never become exactly equal, of course, since a sufficient difference must continue to exist to overcome the effect of friction. However, it will be apparent that the amount of current required by the winding under these conditions will be a function of this difference, and that the amount of current being drawn by the winding will be smallest when the difference in intensities is at a minimum.

As hereinbefore stated the intensity of the second field is also a function of the frequency of the energizing current. It will be apparent that since the amperage rises and falls in the winding as a function of the sinusoidal configuration of the AC input current, and since it is the rise of such amperage which produces the turning force on the winding, the winding will tend to accelerate in rotational velocity as the amperage rises in it. Since the amperage also follows a sinusoidal pattern of rise and fall, and since a reversal of polarity in the winding would oppose its rotation, it is conventional to rectify the intput AC current so as to eliminate all "negative" pulses. Decrease in amperage does not retard acceleration of the winding, of course, provided it does not effect a reverse of polarity, but it does not assist acceleration. Accordingly, it will be apparent that acceleration of the winding, and a decrease in the distance between the poles, will continue until a time factor is achieved which corresponds to the peak of the current pulses. At this point, a state of equilibrium is achieved which is commonly referred to as the "terminal velocity" of the motor.

It will be apparent at this point that the current required to maintain this equilibrium is now stabilized at a minimum value, and that the force required to effect rotation of the winding at "terminal velocity" is also at a minimum, as long as the other parameters (amperage, frequency, load on the motor, etc.) are maintained as constants. It will further be apparent, that if the frequency of the input current is increased, the time factor will also change so as to further decrease the distance which exists between attracting poles upon the occurence of each current pulse. The motor will then increase its RPM until this new higher "terminal velocity" is achieved. It should also be noted, however, that this increase in velocity is accompanied by a proportional decrease in the amount of current required by the winding.

Referring again to the force being required to turn the winding, it should be noted that the amount of force (or torque) being delivered by the motor shaft 9 is inversely proportional to the force required to turn the rotatable winding. Thus, the delivered torque is smallest upon initial actuation of the motor, and is greatest when the motor achieves "terminal velocity". Furthermore, it will be apparent that an increase in the frequency of the current energizing the rotatable winding will produce an increase in delivered torque which is far out of proportion to the increase in current required by the motor.

As hereinbefore stated, it is conventional for AC current to be rectified before being applied to a permanent magnet motor, in order to eliminate all pulses of unwanted polarity. It will be apparent that such "half-wave" rectification results in elimination of half of all of the current pulses composing the AC power signal available, but this is not deemed significantly detrimental in most applications wherein simplicity and economy of design is of paramount importance. Accordingly, so-called "full-wave" rectification is not generally used except in those instances wherein a maximum terminal velocity is desired and, in those instances, it is usually if not always preferable to employ a motor having windings in lieu of permanent magnets, and to employ instead a commutator so as to eliminate all need for rectification of the AC signal.

It has heretofore been conventional to power cord-type vegetation cutters with permanent magnet motors because of their higher torque capabilities as compared with solenoid-type motors of the same size. It has also heretofore been conventional to employ only half-wave rectification in permanent magnet motors used with vegetation cutters, since full-wave rectification does not produce a significantly higher terminal velocity for these motors, and since a substantial increase in RPM will tend to produce string breakage at an unacceptably high rate of frequency. What has not heretofore been recognized, however, is that a small increase in terminal velocity for a motor will produce a disproportionately large increase in delivered torque. Cutting effectiveness of any cord-type cutter is directly proportional to the magnitude of impact being delivered against the vegetation by the tip of the revolving cord. The amount of this tip impact or tip energy is directly proportional to the delivered torque of the motor shaft, and since fullwave rectification produces a substantial increase in the torque delivered by the motor shaft, it will be apparent that full-wave rectification of the input AC to the motor will greatly enhance the cutting effectiveness of such appatus.

This increase in delivered torque has overall significance to the operation of cord-type vegetation cutters for another reason. Cutting effectiveness is a function of cord diameter as well as motor RPM, and since full-wave rectification produces a large increase in delivered torque without a proportionately large increase in motor RPM, the cutting effectiveness of the apparatus is increased without an unacceptable increase in the breakage rate of the cutting string. Moreover, this increase in delivered torque also permits the use of cutting lines of larger diameter which, in turn, not only further increases the impact and therefore the cutting effectiveness of the apparatus, but also further reduces the frequency of string breakage. Note also that, since the terminal velocity of the motor is increased, albeit only moderately, the foregoing advantages are attained with only an insignificant increase in the power requirements of this equipment.

The cutting line 11 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 11 should preferably have sufficient fatigue, abrasion, impact resistance, and tensile strength to allow a reasonable service life, and should have as small a diameter as is consistent withe the foregoing parameters so that the sharpest cutting edge is provided for effecting cutting of the grass, weeds, or the like. The line 11 should further preferably be as light-weight as possible, so that when the line shears or breaks during use and pieces are thrown from the cutting head, such pieces will travel only a limited distance and will strike persons or other objects in the immediate vicinity with little or no appreciable impact.

Cutting may be achieved with line 11 formed of a metal material, and such lines may have a greater tensile strength than if formed of nylon or the like. Metallic lines are more subject to breakage because of fatique, however, and the relatively greater mass of a piece of metal cutting line will cause it to travel like a projectile for a considerable distance if breakage occurs. In addition to this dangerous feature, the fact that the greater mass of a metallic line requires a larger, heavier motor 6 of greater power makes the use of metallic line undesirable for present purposes. On the other hand, the relatively small mass of a line formed, for example, of an extruded nylon monofilament, creates complex design problems which must be effectively solved to achieve effective cutting of lush vegetation, and this will become even more apparent when it is recognized that only the last one full inch or so of the line actually impacts against the vegetation sought to be cut.

In view of the above, and in further regard to the theory of the invention, it should be understood that in a rotating system as above described, the tip impact has been found to be a function of the mass of the tip of the flexible line member and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered.

In order to understand the relationship of tip impact being a function of tip mass and tip velocity, each of the latter two must be considered separately as will be set forth hereinafter.

Thus, it has been determined that tip mass is a function of the mean cross-sectional diameter of the line member and the mass of the material of construction of said line member. Since it is contemplated as above set forth to construct the line member of a material such as nylon, it will be apparent that this light-weight type of material will possess a very small mass. Thus, in its relationship to tip mass, the mass of the material of the line member will be negligible. Therefore, it will be readily seen that the primary factor determining tip mass is the mean cross-sectional diameter of the line member. Hence, when speaking in terms of tip mass, it should be clear that this term is considered to include primarily the mean cross-sectional diameter of the line member and with little or no emphasis upon the mass of the material of which the line member is made.

As hereinbefore explained, tip impact is a function of tip mass and tip velocity, tip mass being essentially the mean cross-sectional diameter of the line member. Considering tip velocity, it has been found that this feature of the tip impact is a function of each of the following four parameters:

(1) the mean cross-sectional diameter of the line member,
(2) the length of the line member,
(3) the diameter of the head, and
(4) the RPM of the motor shaft.

A variation of any one or more of the above four factors will obviously vary the tip velocity, and therefore vary the tip impact feature. Thus, tip velocity will change as the diameter of the line member is increased or decreased, as the line member is shortened or lengthened, as the size of the head is increased or decreased, and as the speed of the motor is raised or lowered. In order to understand how each of these factors affects tip velocity, it is necessary to consider each one in its relationship to the other and in its function in the particular vegetation cutting environment.

Referring to the mean cross-sectional diameter of the line member, this factor has been found to have an effect upon tip velocity due to a phenomenon known as "windage". Thus, as the line member is rotated it encounters the resistance of air. It will be apparent that the resistance of air to the passage of the rotating line member causes a drag on the line member. Hence, the greater the diameter of the line member, the greater is the drag. Conversely, smaller diameter line members create less drag. Thus, variation of the diameter of the line member varies the "windage" or drag factor, which in turn varies the tip velocity, thereby changing the tip impact.

With reference to the length of the line member, this factor contributes in some degree to the windage phenomenon noted above. Thus, a given length of line member of a specified cross-sectional diameter will encounter the resistance of air as it is rotated. The resultant drag on the given length of line member will remain constant as the length of line member remains the same. If, however, the line length is increased, a greater drag factor is produced. If, on the other hand, the length of line is decreased, drag is reduced, tip velocity is increased, and tip impact is improved, resulting in a better cut. It should, in addition, be noted that the relationship between the length of the line member and its cross-sectional diameter contribute to the windage or drag factor. Thus, to minimize windage or drag, it should be apparent that a line member of the shortest effective length and the smallest effective mean cross-sectional diameter be employed. These minimum requirements present the least amount of surface area subject to the resistance of air during rotation, and therefore create the least amount of drag.

In addition to drag, the length of the line member also has an additional effect upon tip velocity, partially due to the nature of the line member itself. Thus, under normal operating conditions, the line member will be extended outwardly in a more or less straight fashion, thereby utilizing its total actual length. This is due to the centrifugal force generated upon rotation of the line member, which force acts to straighten out the flexible line member. However, if during the operation of the device the resistances of the air and/or grass against the line member are sufficient to overcome the centrifugal force tending to straighten out the flexible line along its axial length, the line member at its outermost portion will tend to trail behind that portion of the line member attached to the head. This trailing effect is due to the flexible nature of the line member itself, as well as to the resistances encountered. Needless to say, any trailing of the tip portion of the line member behind the portion of the line attached to the head reduces the effective overall length of the line member, thereby reducing the tip velocity which in turn reduces tip impact. In rather extreme cases of trailing, the lag of the tip of the line member will be such as to provide an arcuate shape to the line member rather than a substantially straight line extension as is desired.

Referring now to the head diameter factor and its relationship to the tip velocity, it should be understood that the head supports a portion of the line member. Thus, to theoretically determine the exact length of the line member factor, the radius of the head must be taken into account. For practical purposes, therefore, line length is actually the length of exposed line, that is, the length of line measured from the circumference of the head to the tip of the line member, plus a distance equal to the radius of the head. Obviously, a change in the size of the head will therefore affect the tip velocity due to its contributing a radial length to the line member itself.

In addition to line member length affect, head diameter affects tip velocity due to its mass. For example, assuming identical materials of construction of the head, it will be apparent that a head of large diameter will of necessity weigh more than a head of small diameter. Since mass constitutes a load on the motor any variation of mass of the head will vary the motor load which, in turn, will vary tip velocity and tip impact. Therefore, it should be apparent that the selection of the materials of construction of the head and the particular head diameter selected are important factors in arriving at an assembly for effectively and efficiently cutting vegetation.

Considering the RPM of the motor shaft and its effect upon tip velocity and, therefore, tip impact, it should be noted that any decrease in RPM will reduce the tip velocity. Conversely, a better tip velocity is achieved as RPM increases. Primarily of concern is the RPM decrease and the factors contributing thereto. Given a preselected motor design of specific RPM rating, it will be apparent that this particular RPM rating may be decreased by variation in system design. Thus, any change in the load on the motor shaft will affect RPM. For example, an increase in mass will decrease the RPM. A larger diameter head, of greater mass, will put a greater load on the shaft, thereby affecting RPM. A line member of greater length and/or greater mean cross-sectional diameter will also add mass to the system and therefore increase the load on the motor shaft, thus affecting RPM and tip velocity and impact, but to a lesser extent. Another load factor on the motor shaft tending to affect RPM is the result of windage or drag. As set forth above, this resistance phenomenon is a function of the length of the line member and the cross-sectional diameter of same. Thus, to maintain a minimum of drag results in a substantially lessened effect upon load, thereby reducing drag as a factor in RPM variation. With reference to the trailing effect of the line member as noted above, it should be understood that the RPM of the motor shaft must be sufficient to impart enough of a centrifugal force to the line member to maintain the line member in a substantially straight line relationship rather than the somewhat arcuate shaped configuration produced when resistances are encountered.

It should therefore be apparent, that numerous factors and interrelationships therebetween are involved in arriving at an effective and efficient vegetation cutting assembly of the flexible line member type. The design parameters and selection of same are complex since many are dependent one upon the other, and therefore critical. Thus, it will be seen that more is involved herein than just merely rotating a flexible string.

Figure 2:
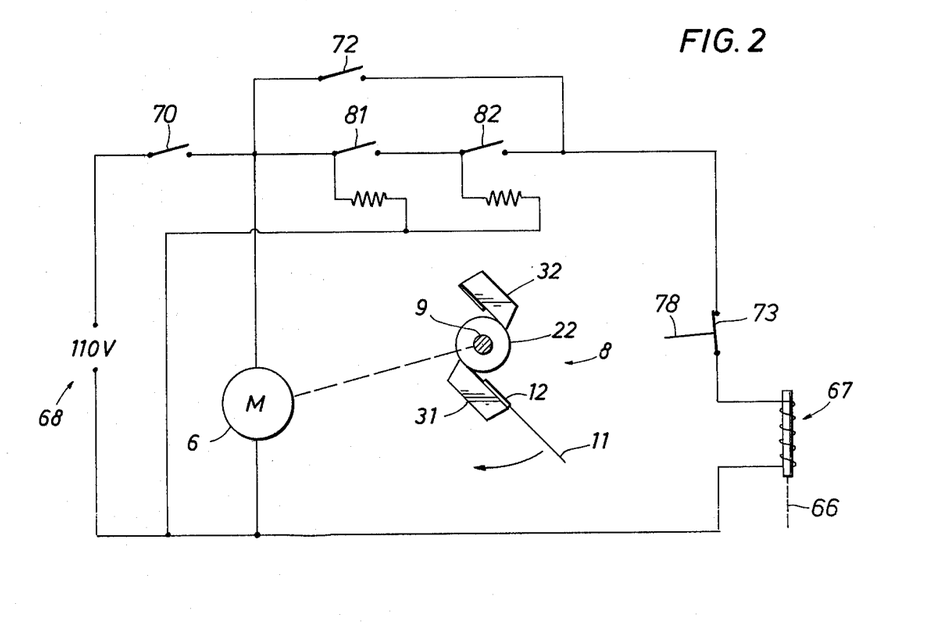
FIG. 2 is a pictorial representation of one form of electrical circuitry suggested in the apparatus depicted in the present invention.

Referring now to FIGS. 1 and 2, power may be applied to motor 6 through a conventional electrical-type insulated cord or conductor 68 including an appropriate plug thereon. The other end of cord 68 passes downwardly through handle 7 and outwardly thereof for connection with the motor 6 by means of connector 69. An appropriate ON-OFF switch 70 may be conveniently located on handle 7 at the upper end thereof for interconnection with motor 6 and conductor 69.

When the rotary head 8 is in a static condition, the cutting strand line 11 tends to dangle flexibly from one of the equally spaced-apart tubes 12 (FIG. 3) to the extent permitted by inherent characteristics of line 11. When the head 8 is rotated by motor 6 at normal operating velocities, the line 11 will stand out rigidly (but also flexibly and yieldably) from the periphery of the cutting head.

In the lawn mower 2, the solenoid 67 can be actuated manually by the operator using a handle-mounted switch 72. Also, electrical control elements associated with the circuitry of the solenoid 67 may also provide for automatic line extension at any time the effective cutting length decreases to less than a preset maximum length. In addition, these control elements may provide for limiting incremental line feeding in manual operation of the switch 72 to the same preset maximum length.

Power is applied to solenoid 67 through a conventional electrical-type insulated cord 71. The cord 71 passes upwardly along handle 7 for connection between the ON-OFF switch 72 (preferably momentary ON type) and the solenoid 67 for manual control of the incremental line feeding sequence. As seen in FIG. 1 an appropriate normally closed switch 73 can be included in series with solenoid 67 in conductor 80 for shutting down the operation of the solenoid 67 when the line 11 is extended to a preset maximum length. With reference to FIG. 3, switch 73 is mounted at the rearward portion upon chassis 3. The switch 73 has a pin member 74 extending downwardly for connection to a pivotally mounted actuator shaft 75. The shaft 75 is mounted in a stationary collar 76 fixed to one wall 79 of chassis 3. A block 77 is attached to the other end of shaft 75 from which hangs a rod 78 for sensing the preset maximum cutting line length. A maximum cutting line 11 length strikes the shaft 75, pivots the pin member and opens the switch 73. As a result, power to solenoid 67 is cut off and immediately stops the feed of additional fresh cutting line 11. The function and operating of the switch 73 and rod 78 prevent successive increments of cutting line from being fed out of the spool 23 until the end of the cutting line 11 would strike the wall 79. The preset length of the extended line 11 is therefore that length required to strike rod 78. Any further extension of the cutting line 11 beyond rod 78 would be determental in the mowing efficiency since the line 11 consumes power by, and is injured by, engaging the wall 79 of the chassis 3. Hence, an ineffective cut would be provided by excessive length of line 11. It is noted, and with particular regard to FIG. 2, that switches 70 and 72 are of the normally open type, whereas the switch 73 is of the normally closed type. Thus, the engagement of the line 11 with the line-limit rod 78 opens the switch 73 to effectively terminate the power supply to solenoid 67 even though the solenoid switch 72 is closed.

The circuitry associated with the solenoid 67 may also include an automatic line advance element, as shown in FIG. 2. In parallel to the switch 72, a power control circuit to the solenoid includes timers 81 and 82 which are housed commonly with solenoid 67. The timer 81 provides a suitable delay after the closing of switch 70 to allow the motor 6 to reach operating speed and extend the cutting line. For example, the timer 81 may provide an initial 3-second "off" interval before closing the power circuit to the solenoid 67. The timer 82 has an intermittant ON-OFF function to apply successive power pulses to the solenoid 67. For example, the timer 82 may provide 1-second power pulses at 1-second intervals. The timers 81 and 82 can be of any suitable design such as available under the tradename "Amperite". Thus, switch 70 is closed, motor 6 rotates the head 8 to extend radially the cutting line 11. If the line 11 is less than the preset length, after 3 seconds, the timer 81 closes the circuit, timer 82 pulses the solenoid 67 until the incremental line is extended to strike rod 78 which opens the power circuit by opening switch 73. In automatic operation, the cutting line 11 is always at the preset maximum length for cutting a uniform swath width. No cutting line or mowing efficiency can be lost by using the automatic line advance feature of the lawn mower 2.

The mowing device 2 will be described in operation in reference to FIGS. 1 – 4. Switch 70 is actuated and power is applied to motor 6. The head assembly 8 rotates with the nylon flail or line 11 extending straight and radially to sever the grass at its tip. The mower 2 is moved back and forth through the vegetation in a more or less coordinated swath-like sequence. In a non-automatic function, when the line becomes shortened due to wear or breakage or for other reasons, switch 72 is actuated manually ON-OFF during normal cutting operation to advance an incremental length of cutting line 11 from the head 8. Each switch operation energizes solenoid 67 to actuate the cam assembly 58. As a result, shaft 62 rotates to press roller 64 against cam disc 54. This movement of cam disc 54 pivots lever 46 thereby unlocking one of pins 49 and 50 from the teeth 41 and in turn locking the other pin. When the solenoid 67 is deenergized, the previously unlocked pin 49 or 50 moves downwardly into locking engagement with one of teeth 41 and the camming mechanism 58 returns to a non-feeding position. During pin locking and unlocking, centrifugal force on the line 11 moves the spool 23 rotationally within head 8 for thrusting outwardly therefrom an incremental length of line.

In automatic operation (switch 72 open) the timers 81 and 82 provide for successive energizations of the solenoid 67 until the cutting line is of a length to strike rod 78. At this time, the system returns into a non-feeding condition. Closing of switch 72 will defeat automatic operation by keeping solenoid 67 energized.

When coiled storage portion 35 of line 11 on the spool 23 is finally exhausted, the head assembly is removed and a fresh supply of line is wound upon the spool. The fresh line should be wound in the direction opposite the direction of rotation of the head member. In the alternative, the spent spool may be replaced with a pre-wound spool. Preferably spare pre-wound spools are used when field rewinding of the empty spool would be inconvenient or for other reasons.

From the foregoing description, it will be apparent that there has been provided in apparatus and method a novel rotary lawn mower using a rotating head with non-metallic flexible line adapted to cut a swath in a lawn. In particular, the novel lawn mower includes a feed system, operated manually or automatically, for extending an incremental length of line from the rotating head into the cutting plane. However at all other times the cutting line is secured within the head against unintended unreeling. In no event can an excessive or wasteful length of line be extended manually or automatically from the head. It will be understood that certain changes or alterations of the present lawm mower may be made without departing from the spirit of this invention. These changes are contemplated by and are within the scope of the appended claims which define the invention. Additionally, the present description is intended to be taken as an illustration of this invention.

What is claimed is:

1. A lawn mower for mowing the vegetation growing on turf comprising:
   (a) head means rotatable about an axis substantially perpendicular to a cutting plane and having a spool means movably mounted therein;
   (b) drive means for rotating said head means about said axis in said cutting plane;
   (c) flexible non-metallic line member having a portion carried on said spool means and further having a free end portion extending outwardly of said head means into the cutting plane;
   (d) first means for securing said spool means against movement within said head means;
   (e) second means for releasing said spool means for movement through an incremental distance within said head means to extend only a discrete incremental length of said line member from said head means and then securing said spool means against movement within said head means; and
   (f) third means for actuating said releasing means during rotation of said head means.

2. The mower described in claim 1, wherein said third means includes a solenoid adapted for releasing the spool means for movement within said head means.

3. The mower described in claim 2, including a cam mechanism in association with said solenoid.

4. The mower described in claim 3, said cam mechanism including an eccentrically driven roller.

5. The mower described in claim 4, including a shaft connected to said roller and means for operatively associating said shaft with said solenoid.

6. The mower described in claim 5, said associating means including a downwardly extending force bar for rotating said shaft.

7. The mower described in claim 1, wherein said second means includes a biased disc member.

8. The mower described in claim 7 and including a pivoted lever disposed beneath said disc member.

9. The mower described in claim 8, wherein said lever is provided with at least two downwardly extending pin members.

10. The mower described in claim 9, and including a toothed ratchet spaced below said lever, and with said pin members being arranged for alternate locking and unlocking engagement with the teeth of said ratchet.

11. The mower described in claim 6, wherein said second means includes a biased disc member.

12. The mower described in claim 11, and including a pivoted lever disposed beneath said disc member.

13. The mower described in claim 12, wherein said lever is provided with at least two downwardly extending pin members.

14. The mower described in claim 13, and including a toothed ratchet spaced below said lever, and with said pin members being arranged for alternate locking and unlocking engagement with the teeth of said ratchet.

15. A lawn mower for mowing the vegetation growing on turf comprising:
   (a) head means rotatable about an axis substantially perpendicular to a cutting plane and having a spool means movably mounted therein;
   (b) drive means for rotating said head means about said axis in said cutting plane;
   (c) a flexible non-metallic line member having a portion carried on said spool means and further having a free end portion extending outwardly of said head means into the cutting plane;
   (d) first means for securing said spool means against movement within said head means;
   (e) second means for releasing said spool means for movement through an incremental distance within said head means to extend only a discrete incremental length of said line member from said head means and then secure said spool means against movement within said head means;
   (f) third means for actuating said releasing means during rotation of said head means; and
   (g) limit means for deactuating said third means when said line member is extended a preset length from said head means.

16. The mower described in claim 15, wherein said third means includes intermitter means for succesively releasing said spool means for movement relative to said head means whereby a succession of discrete incremental lengths of said line member are extended from said head means.

17. The mower described in claim 15, wherein said third means includes a solenoid adapted for releasing the spool means for movement within said head means and said limit means includes switch means adapted to deenergize said solenoid when said line member is extended to the preset length.

18. The mower described in claim 17, wherein said third means includes intermitter means for successively energizing said solenoid allowing the spool means to move relative to said head means whereby a succession of discrete incremental lengths of said line member are extended from said head means.

19. The mower described in claim 17, wherein said third means includes a shaft connected to an eccentric mounted roller and means for operatively associating said shaft with said solenoid.

20. The mower described in claim 19, said associating means including a downwardly extending force bar for rotating said shaft.

21. The mower described in claim 15, wherein said second means includes a biased disc member.

22. The mower described in claim 21, and including a pivoted lever disposed beneath said disc member.

23. The mower described in claim 22, wherein said lever is provided with at least two downwardly extending pin members.

24. The mower described in claim 23, and including a toothed ratchet spaced below said lever, and with said pin members being arranged for alternate locking and unlocking engagement with the teeth of said ratchet.

25. The mower described in claim 20, wherein said second means includes a biased disc member.

26. The mower described in claim 25, and including a pivoted lever disposed beneath said disc member.

27. The mower described in claim 26, wherein said lever is provided with at least two downwardly extending pin members.

28. The mower described in claim 27, and including a toothed ratchet spaced below said lever, and with said pin members being arranged for alternate locking and unlocking engagement with the teeth of said ratchet.

29. The mower described in claim 15, wherein said limit means includes a downwardly projecting and pivoted pin member.

30. The mower described in claim 29, and including switch means responsive to said pivoted pin and being operatively associated with said second means.

31. The mower described in claim 20, wherein said limit means includes a downwardly projecting pin member pivoted upon engagement by said line member when extended from said head means the preset length.

32. The mower described in claim 31, and including switch means responsive to said pivoted pin and being operatively associated with said solenoid.

33. The mower described in claim 24, wherein said limit means includes a downwardly projecting and pivoted pin member.

34. The mower described in claim 33, and including switch means responsive to said pivoted pin and being operatively associated with said second means.

35. The mower described in claim 28, wherein said limit means includes a downwardly projecting and pivoted pin member.

36. The mower described in claim 35, and including switch means responsive to said pivoted pin and being operatively associated with said solenoid.

37. A method for feeding line in a lawn mowing device while mowing vegetation growing on turf comprising:
(a) rotating a head member at a predetermined speed about an axis in a cutting plane extending horizontally to form a swath in the vegetation, said head member containing a supply of flexible non-metallic line carried by a spool member movably mounted within said head member and said line having a free traveling end portion extending from said spool and outwardly of said head member into said cutting plane;
(b) moving said spool member relative to said head member an incremental distance during rotation of said head member; and
(c) continuing rotation of said head member at said predetermined speed of rotation with an additional length of line extending from said head member.

38. The method of claim 37 wherein the movement of said spool member relative to said head member occurs responsively to manual actuation by the operator of the lawn mowing device.

39. The method of claim 37 wherein the movement of said spool member relative to said head member occurs responsively to automatic actuation by a line-length sensor carried on the lawn mowing device.

40. The method of claim 39 wherein the line-length sensor is actuated by the tip of the extended line and terminates movement of the spool member relative to said head member thereby preventing extension of an additional length of line from said head member.

* * * * *